United States Patent
Addy et al.

(10) Patent No.: US 8,971,854 B2
(45) Date of Patent: Mar. 3, 2015

(54) SYSTEM AND METHOD OF SPEAKER RECOGNITION

(71) Applicant: Honeywell International Inc., Morristown, NJ (US)

(72) Inventors: Kenneth L. Addy, Massapequa, NY (US); Ronald K. Rothman, Smithtown, NY (US)

(73) Assignee: Honeywell International Inc., Morristown, NJ (US)

( * ) Notice: Subject to any disclaimer, the term of this patent is extended or adjusted under 35 U.S.C. 154(b) by 161 days.

(21) Appl. No.: 13/710,128

(22) Filed: Dec. 10, 2012

(65) Prior Publication Data

US 2014/0004826 A1 Jan. 2, 2014

Related U.S. Application Data

(60) Provisional application No. 61/661,424, filed on Jun. 19, 2012.

(51) Int. Cl.
| | |
|---|---|
| H04M 1/66 | (2006.01) |
| H04W 12/06 | (2009.01) |
| G10L 17/00 | (2013.01) |
| G10L 15/22 | (2006.01) |

(52) U.S. Cl.
CPC ............... *H04W 12/06* (2013.01); *G10L 17/00* (2013.01); *G10L 15/22* (2013.01)
USPC ........................... 455/411; 455/410; 455/420

(58) Field of Classification Search
None
See application file for complete search history.

(56) References Cited

U.S. PATENT DOCUMENTS

| | | | | |
|---|---|---|---|---|
| 7,158,776 | B1 * | 1/2007 | Estes et al. | 455/411 |
| 7,853,243 | B2 * | 12/2010 | Hodge | 455/411 |
| 2005/0096906 | A1 * | 5/2005 | Barzilay | 704/249 |
| 2005/0275505 | A1 * | 12/2005 | Himmelstein | 340/5.8 |
| 2010/0097178 | A1 * | 4/2010 | Pisz et al. | 340/5.72 |

* cited by examiner

*Primary Examiner* — Erika A Washington
(74) *Attorney, Agent, or Firm* — Husch Blackwell LLP

(57) ABSTRACT

An authentication and authorization apparatus combines a unique identifier for a communications device with pre-stored voice recognition information. Incoming audio, associated with the unique identifier is processed using the pre-stored vice recognition information to authenticate the speaker. In response to successful authentication, a requested function or action embedded in the audio can be recognized and, if authorized, implemented.

10 Claims, 3 Drawing Sheets

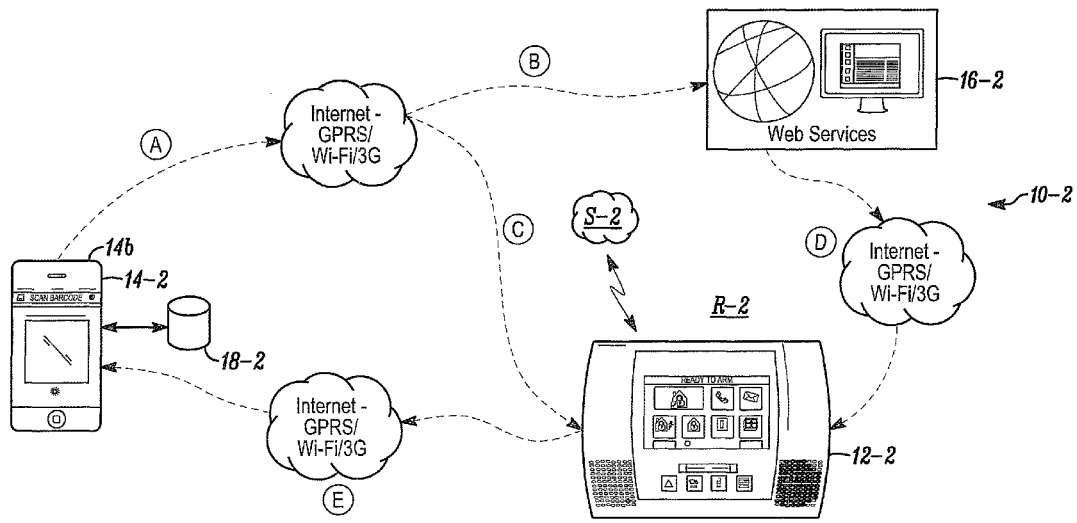

The smart-phone itself runs an application that matches the operator's voice to the phone & determines whether the phone should take certain actions The phone itself may determine whether the voice matches the expected "owner's" or "operator's" voice. So before enabling the NFC chip, or before transmitting the voice stream, the application running on the phone determines if the voice is correct

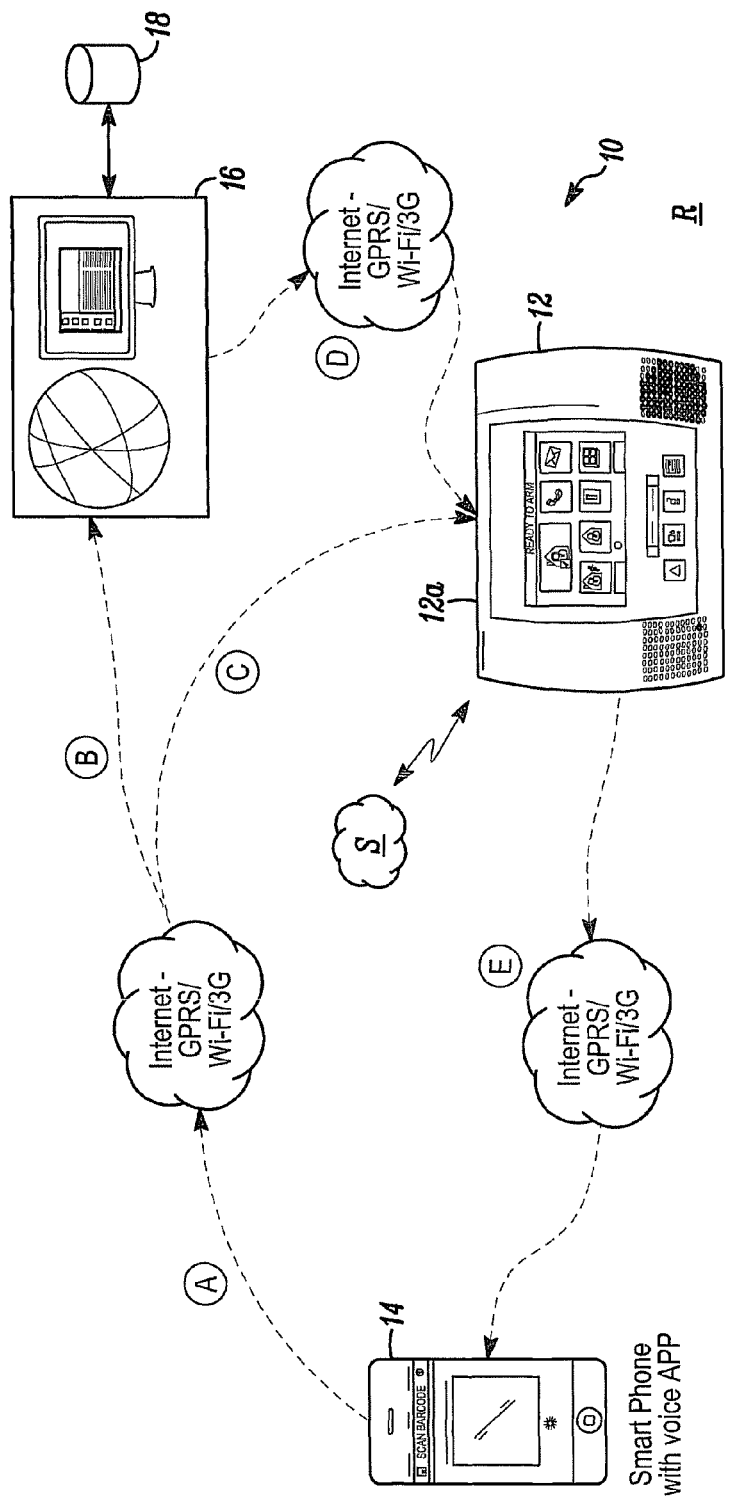

FIG. 1

When operating a voice recognition activity via a central (local or remote) computing station, the MEID, MAC, MIN or IMEI is encapsulated as part of the digitized voice data stream and this information provides additional originating information so that the voice recognition algorithm can target a specific user, allowing faster, more reliable and more secure processing (Fig 1)

An application program running on a mobile phone could transmit digitized speech to a central computing facility which would then recognize the word "disarm" from a certain user, and could then send the necessary digital data over a network to disarm a specific security system, enable specific lighting scenes, unlock certain doors etc. Note that the central computing facility, upon receipt of the data stream, determines whether the phone ID and the voice of the listed operator match

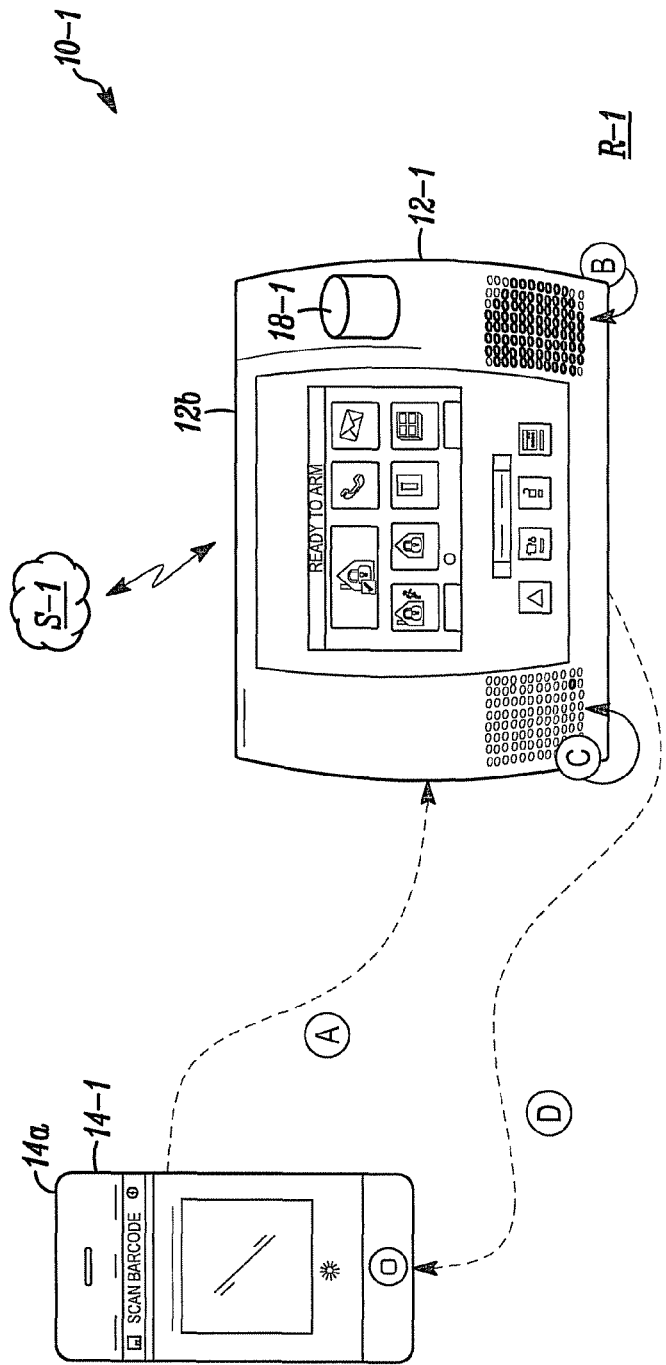

When operating a local system, the unique identifier provided by the near field communication (NFC) chip within the smart phone may be used to identify the voice of the phone owner so that the local recognition algorithm can simply match the voice to the proper credentials (Fig 2)

In a residential home security system a phone that is NFC enabled arms or disarms a security system. In this case the system then prompts for a voice command which is enacted only-if the NFC and voice are a matched-pair

FIG. 2

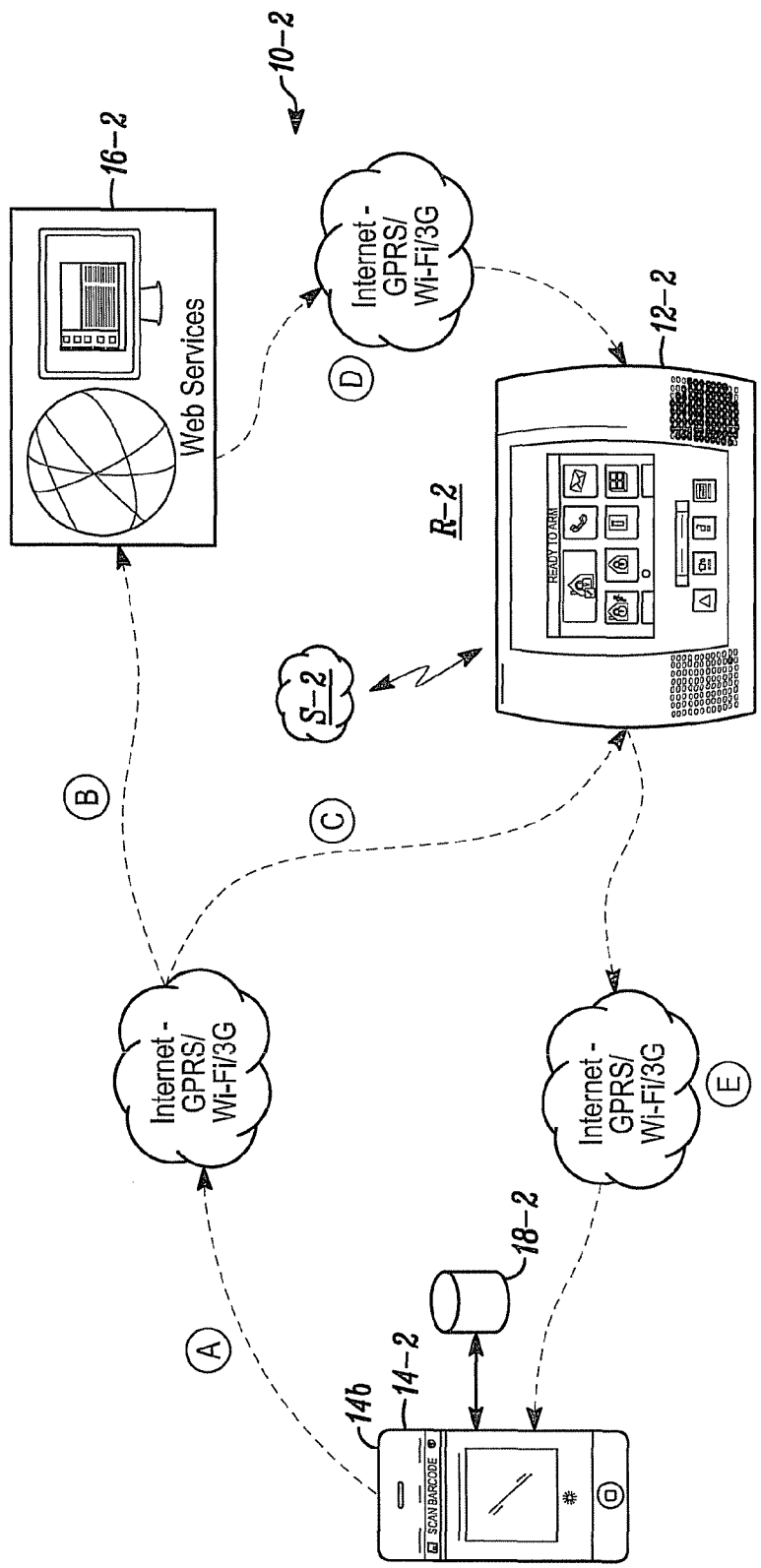

FIG. 3

The smart-phone itself runs an application that matches the operator's voice to the phone & determines whether the phone should take certain actions (Fig 3)

The phone itself may determine whether the voice matches the expected "owner's" or "operator's" voice. So before enabling the NFC chip, or before transmitting the voice stream, the application running on the phone determines if the voice is correct

SYSTEM AND METHOD OF SPEAKER RECOGNITION

CROSS-REFERENCE TO RELATED APPLICATION

This application claims the benefit of the filing date of U.S. Provisional Application Ser. No. 61/661,424 filed Jun. 19, 2012, entitled, "Voice Commanded Mobile Security Controller". The '424 application is hereby incorporated herein by reference.

FIELD

The application pertains to systems and methods for providing secure voice control of wireless communications devices. More particularly, the application pertains to such systems and methods which provide authentication of a speaker using multiple identifying indicia.

BACKGROUND

There is increasing use of "apps" in mobile devices, e.g. tablet computers, smart phones and personal digital assistant (PDA's) to control various building and home automation systems over local area and wide area networks. In addition, there are applications that run on these mobile devices which recognize human speech and perform some task on the device itself or at a central location. In order to improve the human-machine-interface in an automation system, a speech recognition application running on a mobile device which converts speech into digital form and then to other communication protocols suitable for transport on a LAN/WAN, provides a reliable, hands-free, convenient method of use. The '424 application, incorporated herein by reference discloses one such system.

While useful, speech recognition systems can exhibit limitations from a security point of view since speech, not "voice" is being recognized. Speech recognition is much simpler to perform than individual voice recognition. The recognition process however does not necessarily provide a desired level of authentication. Speech recognition is not necessarily tied to an individual. Hence, it would be useful to authenticate the user or speaker in such systems.

BRIEF DESCRIPTION OF THE DRAWINGS

FIG. 1 illustrates a diagram of a system in accordance herewith;

FIG. 2 illustrates a diagram of another system in accordance herewith; and

FIG. 3 illustrates a diagram of yet another system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, authentication can be implemented prior to speech recognition to provide an increased level of security. In this regard, and to reduce the complexity of voice recognition, it is preferred to target a particular speaker's voice rather than search an extensive database having information associated with a plurality of speakers to find a particular voice.

Advantageously, the particular speaker can be associated with a particular, wireless communication device, for example using a unique smart-phone ID to reduce the complexity of the voice recognition, authentication process. Another benefit of linking a particular voice and particular device is that certain specific profiles and activities can be authorized subsequent to authentication. For example, a message from a home-owner's phone might produce a different result than a message from a child's or a nanny's mobile phone.

When authenticating a speaker by carrying out a voice recognition activity via a central remote computing station, the wireless device identifier, such as the mobile equipment identifier (MEID), mobile identification number (MIN) or international mobile equipment identifier (IMEI) provide additional originating information so that the voice recognition algorithm can target a specific user. As a result, faster, more reliable and more secure processing can be provided. Additionally authorization can be provided relative to profiles available to a phone/user.

In one aspect, a previously downloaded application being executed on the smart phone digitizes the speech of the individual and sends the information with the mobile device's globally unique identifier to a central computing location. The unique phone ID can be used to identify a particular individual. The authentication process, the voice recognition processing, can use the phone ID as a vector or index into a voice recognition data base which can provide reliable, quicker and secure results.

In another aspect, the wireless communications device can include authentication information for the expected user of that device. In this embodiment, the authentication, and authorization, processing can take place locally at the device. For example, a smart phone. Then the requesting message or command can be transmitted.

The application being executed can include a learning phase to improve security by storing certain phrases from certain speakers and storing the voice patterns with the phone identifier, for example an IMEI.

In one embodiment, an application executing on a mobile phone could transmit a command in the form of digitized speech to a displaced computing facility which, after authentification, would then recognize the command or word, for example "disarm", from a certain user. The facility could then send the necessary digital data over a network to disarm a specific security system, enable specific lighting scenes, unlock certain doors etc. A small business owner might say "disarm home" to control her home system, or "arm work" to address a change in her business' system.

In another aspect, advantage can be taken of short range communications technologies such as near field communications (NFC), or BLUETOOTH communications, which can be integrated into mobile phones as well as target devices to be controlled, for example, monitoring systems, sensors, illumination circuits and the like. The authorized user of the phone can move the phone close to a target device of interest. When in range, a communications link between the phone and the target device is automatically established as would be understood by those of skill in the art. The phone's unique identifier (ID) can be used as a vector or pointer into a voice authentication data base, locatable in the phone, in the target device, or in a displaced device all without limitation. The authentication process can be carried out using currently entered voice information from the user. If authentified, speech recognition processing can be used to evaluate the requested function. If the user is authorized relative to the requested function, the target device can implement the request.

In an embodiment of a local system, an ID for a smart phone can be provided by BLUETOOTH communications circuitry, or a near field communication (NEC) chip in the phone. This ID could be used to identify a speaker. Voice authentifing information for the speaker can be retrieved from a data base using the ID as an address into that data base. Authentication software can process incoming audio from the speaker and compare it to the information extracted from the data base for that speaker. Once the authentication process has been successfully concluded, and speech recognition carried out, the subsequently recognized command or request can be transmitted to a security system, or any other type of system, for execution.

FIGS. 1-3 illustrate different embodiments hereof. Other embodiments come within the spirit and scope hereof.

FIG. 1 illustrates a combination 10 which can include a security monitoring system 12. System 12 is installed so as to monitor conditions in a region R via a plurality of wired or wirelessly coupled sensors S. As those of skill in the art will understand, potential conditions include sensing intrusion, temperature, smoke, gas or fire all without limitation. System 12 can include a processor and executable control instructions to operate a display and keyboard 12a for local control as illustrated along with a local speaker and microphone.

An exemplary wireless communications device, such as a smart phone, 14 can include a previously downloaded application, app, The app facilitates authentication and authorization. A user of the phone 14 can verbally speak a command or request into phone 14.

The incoming audio message is digitized and transmitted, using the app executing on the phone 14, along with a phone identifier ID, via a wireless medium to a displaced computing facility 16. The facility 16 could include a programmable processor, along with executable control software to receive and process the digitized voice stream and ID from the phone 14. The facility 16 also includes a voice authentication, recognition, data base 18.

Data base 18 can include voice recognition information for a plurality of individuals. The recognition information for each individual is linked to an individual specific identifier associated with a communications device such as a smart phone, personal digital assistant, computer, tablet or the like, without limitation. For example, the identifier of the phone 14 can be stored in the data base 18 linked to information as to the listed operator of the phone 14. The phone identifier can be used as an index or vector to obtain the pre-stored voice based authentication information from the data base 18 for the specific person associated with the device 14.

The facility 16 can then implement an authentication process with respect to the received, digitized voice sample from phone 14. If the voice is authentified, then the facility 16 can recognize the command or request in the speech steam from the user.

The function, command or other request can then be directed back to system 12 for implementation. For example, system 12 can be disarmed, specific lighting scenes can be enabled, doors can be locked or unlocked, status of areas in the region 12 or environmental conditions can be requested by facility 16 from system 12, all without limitation. Confirmation can be subsequently provided to the phone 14 by the system 12.

In accordance with a method as illustrated in FIG. 1, the digitized voice stream and phone ID are transmitted via a WAN, link A, to the facility 16, link B. Some or all of that data can also be transmitted to system 12, link C.

The incoming digitized audio from phone 14 is processed, as described above in facility 16, using data base 18. If the voice is authenticated and is then authorized, the resultant directive, function or request is forwarded to the system 12 for execution via a WAN, link D. Once system 12 has implemented the order, request or the like, a confirmatory message is forwarded to phone 14 and the user via WAN, link E.

Advantageously, in the combination 10, security is enhanced and over-all processing time can be reduced since the facility 16, upon receipt of the data stream from phone 14, can determine, using the ID of the phone 14 to retrieve voice information, if the associated data stream matches the pre-stored voice information of the listed operator of the phone 14 without having to retrieve and process extensive quantities of voice information for a large number of individuals.

FIG. 2 illustrates a local combination 10-1 where a target device, security system 12-1 is coupled to a plurality of sensors, indicated generally at S-1, and is monitoring conditions in a region R-1. In 10-1, authentication and authorization can be performed locally in system 12-1 in response to an ID received from smart phone 14-1, or other wireless device for example a smart card or the like. Short range communications circuitry as indicated at 14a, such as used to implement NFC or BLUETOOTH communications, can interact with corresponding communications circuitry indicated at 12b in system 12-1.

System 12-1 includes a local processor and executable instructions coupled to circuitry 12b as well as to an audio output device, a speaker for example, B and a microphone, or other transducer C. System 12-1 also includes an authentication data base, as at 18-1. Contents of the database 18-1 can be addressed by requester identifiers, corresponding for example to the phone IDs.

In response to receiving an ID from the circuitry 14a, system 12-1 can output a prompt to the user, via the speaker B to enter a password, voice command, or request. The user can speak into the microphone C and provide the request or inquiry to be executed by system 12-1.

An authentication process can be executed by system 12-1 to compare the incoming audio, the password, request or inquiry, to pre-stored voice, authentication information, in database 18-1 associated with the ID received from the smart phone 14-1. Where the voice input via microphone C has been authentified, the request or inquiry can be recognized and the requested command, or request can be implemented at system 12-1.

In accordance with a method as illustrated in FIG. 2, the smart phone 14-1 can be moved or swiped near the system 12-1, link A. The system in response can request a password or other audible input, via speaker B. The user can respond via microphone C. The system 12-1 can process the password or other audible input from the user. If the processed audio matches the pre-stored voice data in the database 18-1 of system 12-1, which is associated with the ID for the phone 14-1, then the requested process, command or inquiry can be implemented via the system 12-1. System 12-1 can confirm to phone 14-1 the status of the implemented process, command or inquiry.

Advantageously, in the combination 10-1, security is enhanced and over-all processing time can be reduced. The system 12-1, upon receipt of the ID from phone 14-1, can determine whether the authentication information in the data base 18-1, associated with the ID of the phone 14-1, matches the received voice sample from microphone C without having to retrieve and process extensive quantities of voice information for a large number of individuals which might be stored in system 12-1.

FIG. 3 illustrates a combination 10-2 which can include a security monitoring system 12-2. System 12-2 is installed so as to monitor conditions in a region R-2 via a plurality of wired or wirelessly coupled sensors S-2. System 12-2 can include a display and keyboard for local control as illustrated.

An exemplary wireless communications device, such as a smart phone, 14-2 can include a previously downloaded app. The app can carry out an authentication process using a local database 18-2 carried in the phone 14-2.

A user of the phone 14-2 can verbally speak a command or request into phone 14-2. The app executed on the phone 14-2 carries out the authentication function, relative to the incoming audio from the user. The received audio, when authentified, can also be processed in phone 14-2 to recognize which command or request has been spoken.

In one embodiment, where the incoming audio corresponds to the pre-stored voice of the authorized user, or owner, the voice stream and mobile phone ID can be transmitted via WAN, links A, B to the displaced computing facility 16-2. Data can also be transmitted from the phone 14-2, via link C to the system 12-2.

The facility 16-2 can process the digitized incoming audio, and if needed carry out a speech recognition function. The request, action, or command can be transmitted from facility 16-2, via link D to system 12-2 for implementation. When the system 12-2 has carried out the requested function, results can be returned to the phone 14-2 via link E.

Alternately, the short range communications circuitry 14*b*, NFC or BLUETOOTH, of the phone 14-2 can be enabled so that phone 14-2 and the system 12-2 can communicate directly. The system 12-2 can then implement the order or request Advantageously, in the combination 10-2, security is enhanced and over-all processing time can be reduced since the phone 14-2, can directly determine whether the incoming audio matches the pre-stored voice of the listed operator of the phone 14-2 without having to retrieve and process extensive quantities of voice information for a large number of individuals.

In summary, relative to FIGS. 2, 3 an ID for a smart phone can be provided by BLUETOOTH communications circuitry, or a near field communication (NFC) chip in the phone. The ID could be used to identify the speaker. Locally stored authentication software, in the phone or target device, can process the incoming audio from the speaker. Once the authentication process has been successfully concluded, and speech recognition carried out, the subsequently recognized command or request can be executed by the target device, such as a security system.

From the foregoing, it will be observed that numerous variations and modifications may be effected without departing from the spirit and scope hereof. It is to be understood that no limitation with respect to the specific apparatus illustrated herein is intended or should be inferred.

It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
    a network enabled telephone-type communication device that receives incoming audio, digitizes the audio and then transmits that digitized audio along with a device identifier, via a network to a displaced computer system;
    the computer system including,
    circuits that sense the device identifier;
    circuits that use the device identifier to select pre-stored voice related information;
    circuits that carry out an authentication process of the incoming digitized audio using the selected information; and
    speech recognition circuits that respond to the results of the authentication process whereby authenticated audio can then be recognized and where, responsive to recognized speech an authorized command or request can be implemented.

2. An apparatus as in claim 1 where the identifier comprises one of a smart phone identifier, or a unique identifier of a wireless communication device.

3. An apparatus as in claim 1 which includes a pre-stored database which contains voice authentication and recognition information for a plurality of individuals.

4. An apparatus as in claim 3 which includes circuits that receive exemplary voice information, and identification information, and store that information in the data base for subsequent retrieval.

5. An apparatus as in claim 1 which includes a regional monitoring system with a pre-stored data base of voice information for a plurality of individuals, wherein the identifier for a selected device provides an address into the data base to retrieve voice information for a person associated with the device.

6. An apparatus as in claim 5 wherein the system provides confirmation, via a network, that the command or request has been implemented.

7. An apparatus as in claim 1 wherein confirmation is provided, via a network, that the command or request has been implemented.

8. A method comprising:
    establishing a data base having identification indicia linked to voice recognition information for each member of a plurality of persons;
    receiving, via a network, digitized audio and a source unit identifier from a displaced source unit, and, using at least the identifier to access the data base to carry out an authentification function relative to the digitized audio, and, if authentified, carrying out speech recognition relative to the digitized audio;
    responsive to the speech recognition, where a function, is recognized and authorized, implementing a requested command or instruction; and
    transmitting, via a network, a confirmatory message to the source unit.

9. A method as in claim 8 which includes providing at least one of a regional monitoring system to implement the requested command or instruction, or, a displaced computer facility, coupled to the source unit, to carry out the authenticating.

10. An apparatus comprising:
    a network enabled telephone-type communication device that receives incoming audio, digitizes the audio and then transmits that digitized audio along with a device identifier, via a network to a displaced computer system;
    the computer system including, a pre-stored data base of voice information for a plurality of individuals, wherein the identifier for a selected device provides an address into the data base to retrieve voice information for a person associated with the device;
circuits that carry out an authentication process of the incoming digitized audio using the retrieved voice information;
speech recognition circuits that respond to the results of the authentication process whereby authenticated audio can then be recognized and where, responsive to recognized speech, an authorized command or request can be implemented; and
wherein feedback is provided to the communication device.

* * * * *